(12) United States Patent
Lefebvre

(10) Patent No.: US 9,194,211 B2
(45) Date of Patent: Nov. 24, 2015

(54) MAGNETS-BASED TOOL FOR PULSING INJECTED LIQUID

(75) Inventor: Lance Leo Lefebvre, Edmonton (CA)

(73) Assignee: WAVEFRONT RESERVOIR TECHNOLOGIES LTD., Cambridge, Ontario (CA)

( * ) Notice: Subject to any disclaimer, the term of this patent is extended or adjusted under 35 U.S.C. 154(b) by 562 days.

(21) Appl. No.: 13/579,319

(22) PCT Filed: Feb. 21, 2011

(86) PCT No.: PCT/CA2011/000194
§ 371 (c)(1),
(2), (4) Date: Aug. 16, 2012

(87) PCT Pub. No.: WO2011/100834
PCT Pub. Date: Aug. 25, 2011

(65) Prior Publication Data
US 2012/0312540 A1  Dec. 13, 2012

(30) Foreign Application Priority Data
Feb. 19, 2010 (GB) .................................. 1002854.6

(51) Int. Cl.
*E21B 34/00* (2006.01)
*E21B 34/08* (2006.01)
*E21B 43/20* (2006.01)

(52) U.S. Cl.
CPC .................. *E21B 34/08* (2013.01); *E21B 43/20* (2013.01)

(58) Field of Classification Search
CPC ......... E21B 3/005; E21B 34/10; E21B 34/06; E21B 34/08; E21B 34/066; E21B 28/00; E21B 4/12; E21B 31/005; E21B 43/20
USPC .......................................... 166/319, 321, 373
See application file for complete search history.

(56) References Cited

U.S. PATENT DOCUMENTS 5,297,631 A     3/1994  Gipson
7,145,834 B1 * 12/2006  Jeter ............................. 367/83
(Continued)

FOREIGN PATENT DOCUMENTS

GB           2430686 A        4/2007
WO      WO2007/036722        4/2007
(Continued)

OTHER PUBLICATIONS

Dialight BLP LTD.,"Latching Solenoids", publish date unknown, author unknown, country of publication—England (consider as prior art).
(Continued)

*Primary Examiner* — Kenneth L Thompson
*Assistant Examiner* — Michael Wills, III
(74) *Attorney, Agent, or Firm* — Anthony Asquith Corp.

(57) ABSTRACT

The pulse-tool is used when injecting liquid into a borehole in the ground. When a pulse-valve of the tool opens, liquid passes through from an accumulator to the ground formation, whereby the accumulator pressure falls and the formation pressure rises. When the pulse-valve closes, the accumulator pressure rises and the formation pressure falls. The pulse-valve is driven to open when the pressure differential (PDAF) reaches a high-threshold, at which the PDAF overcomes a biasing force acting to hold the pulse-valve closed. The biasing force is provided by a pair of magnets, in attraction mode. When the PDAF reaches its high-threshold, and the magnets separate, the magnetic attraction force decreases rapidly. This characteristic helps the pulse-valve to open very rapidly, e.g explosively, creating an energetic penetrative shock-wave out into the formation.

11 Claims, 6 Drawing Sheets

(56) References Cited

U.S. PATENT DOCUMENTS

| | | |
|---|---|---|
| 7,330,397 B2 * | 2/2008 | Ganesan et al. ............... 367/83 |
| 7,417,920 B2 * | 8/2008 | Hahn et al. .................... 367/85 |
| 8,860,417 B2 * | 10/2014 | Wilson ........................ 324/346 |
| 2002/0117306 A1 * | 8/2002 | Hahn et al. ................... 166/373 |
| 2008/0271923 A1 * | 11/2008 | Kusko et al. .................. 175/25 |
| 2008/0302528 A1 | 12/2008 | Samaroo et al. |
| 2009/0114396 A1 * | 5/2009 | Kusko et al. ................. 166/373 |

FOREIGN PATENT DOCUMENTS

| | | |
|---|---|---|
| WO | WO2007/100352 | 9/2007 |
| WO | WO2009/132433 | 10/2009 |

OTHER PUBLICATIONS

"Solenoid Valve Coil Polarity" published on the internet—Solenoid-ValveInfo.com, date and author unknown (consider as prior art).

* cited by examiner

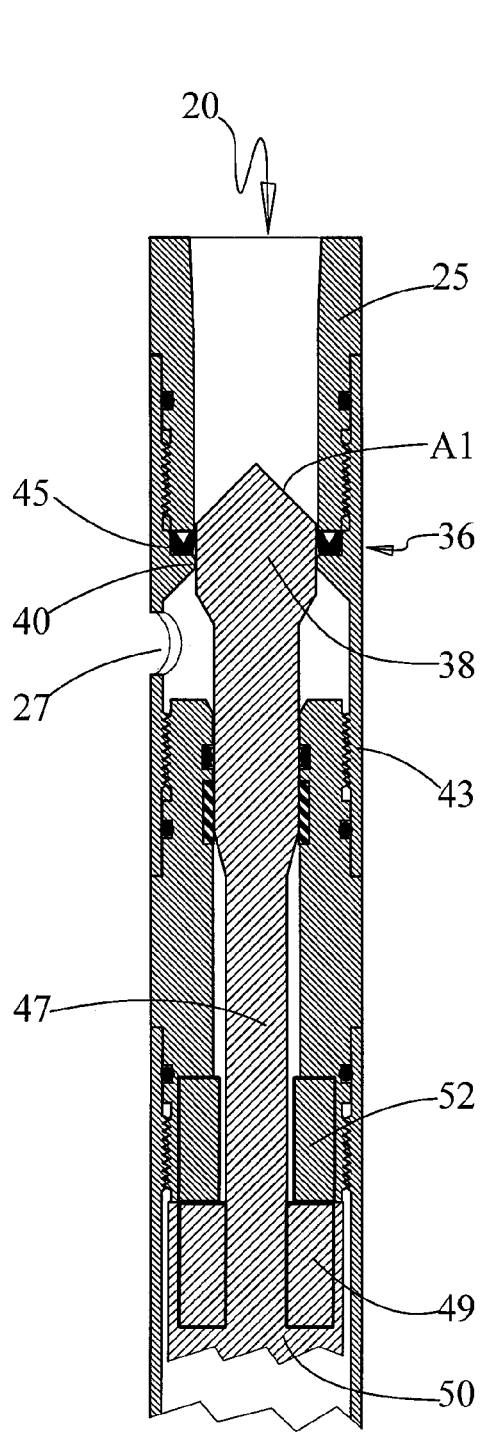
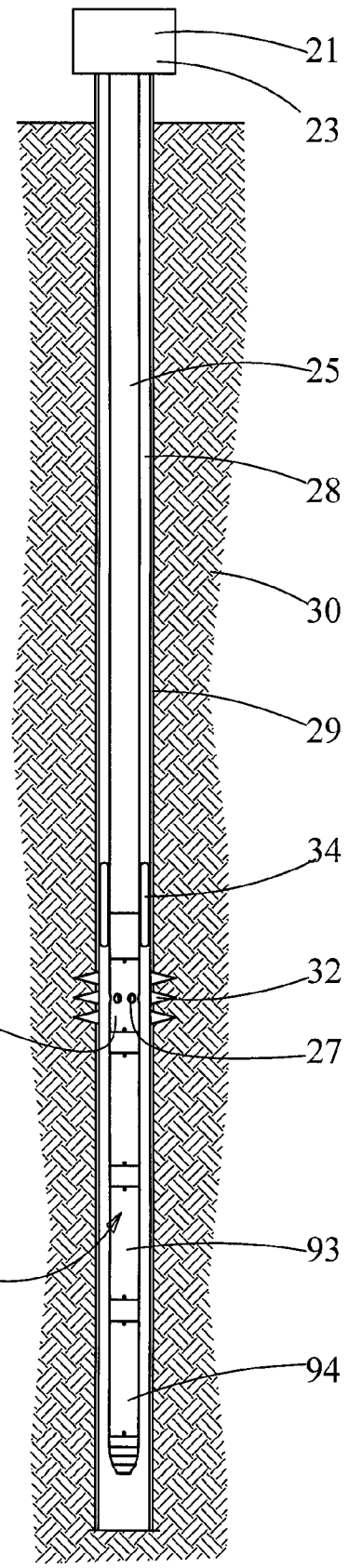
Fig.1
Fig.2

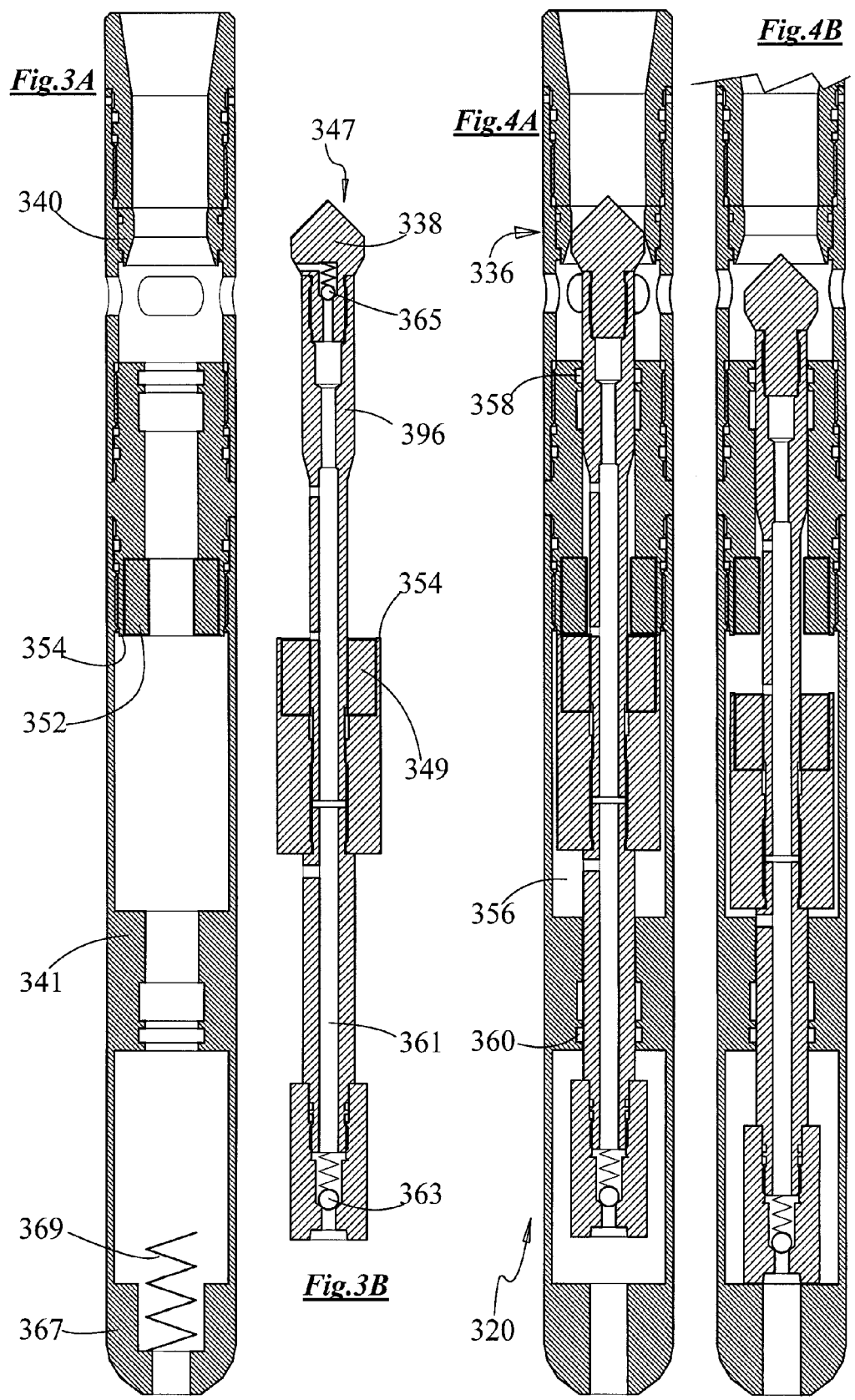

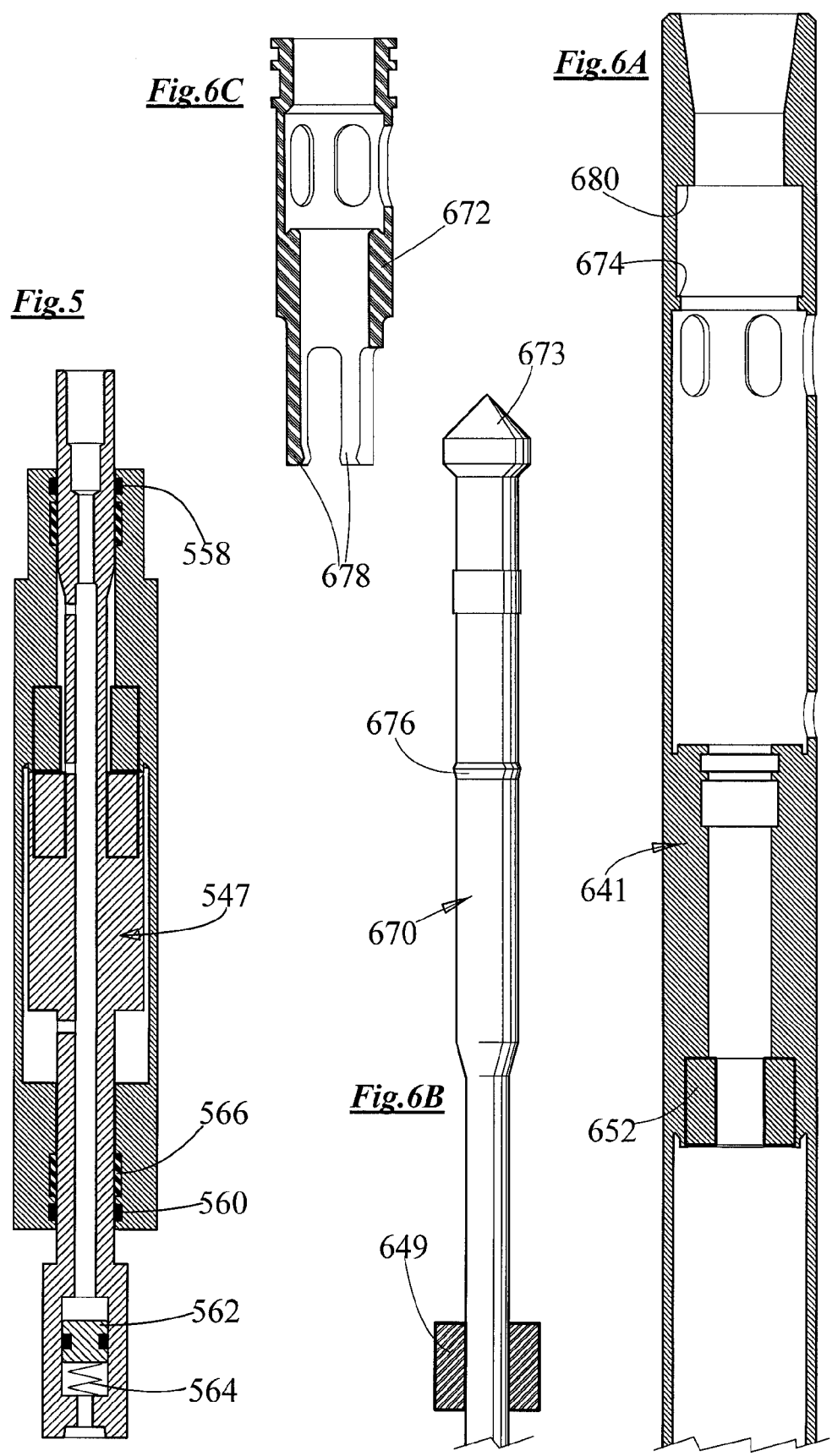

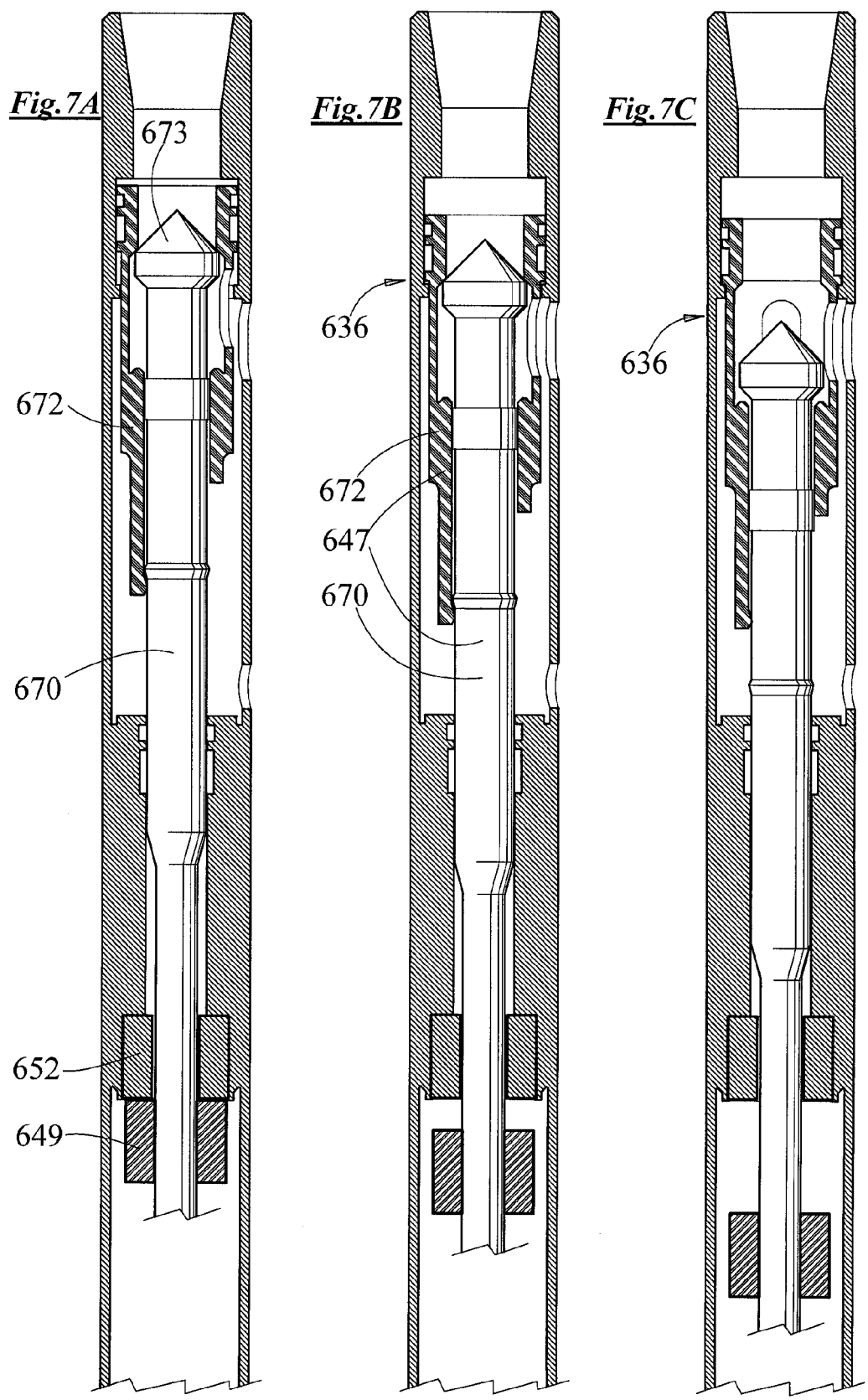

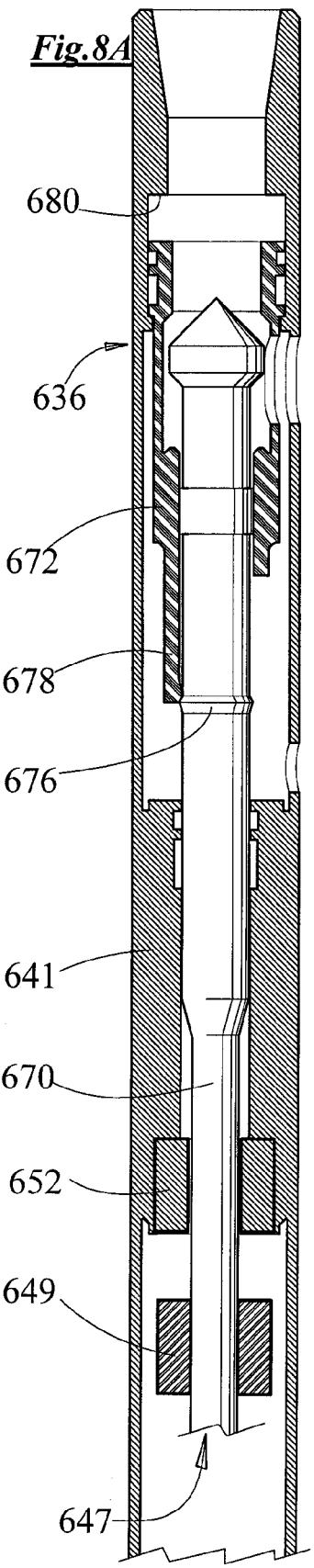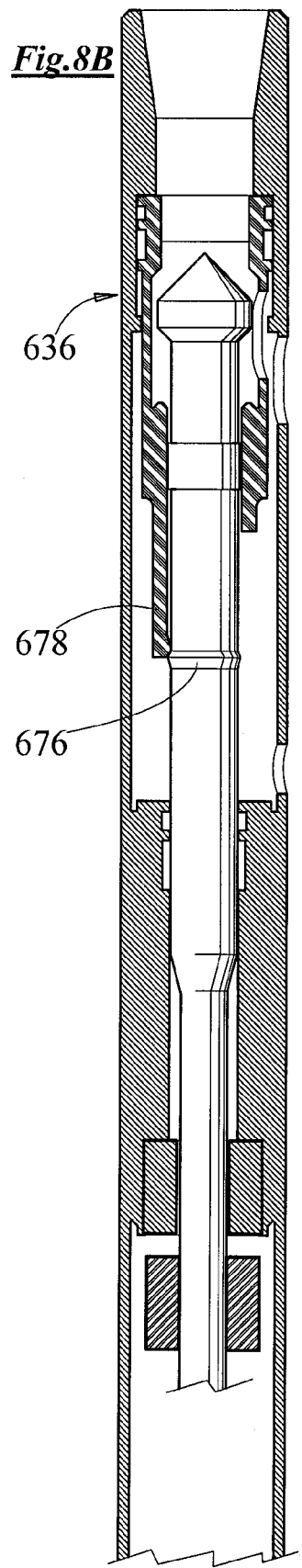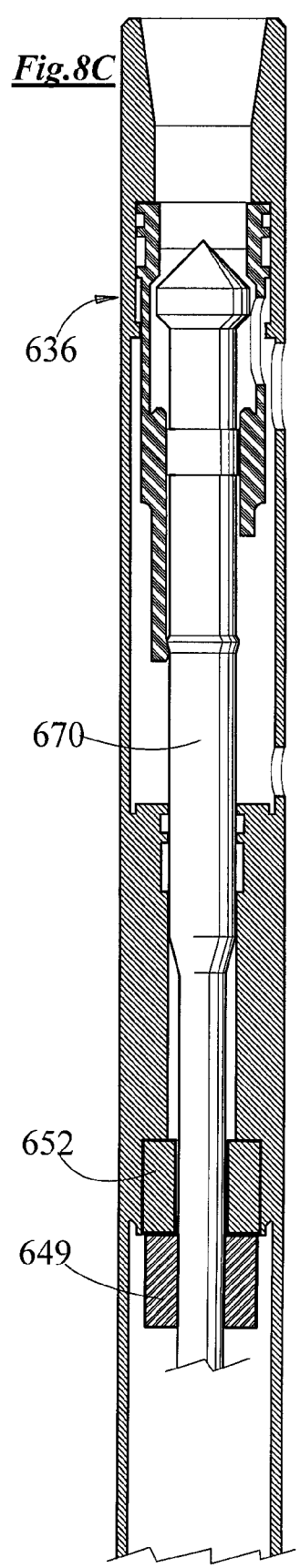

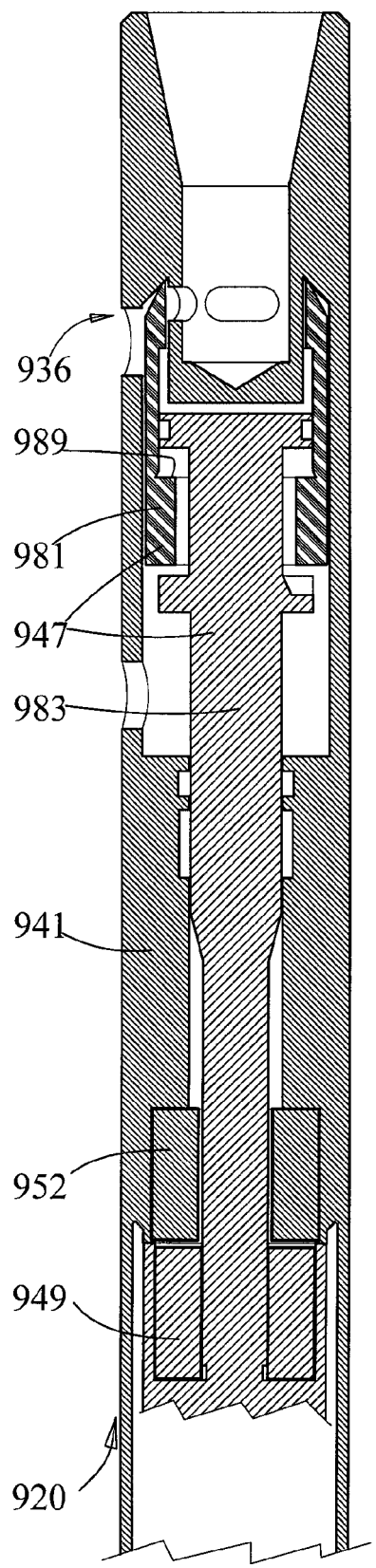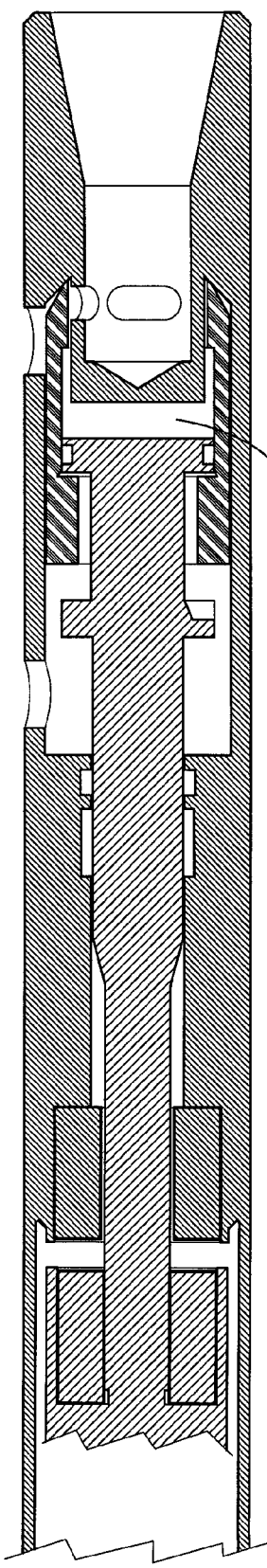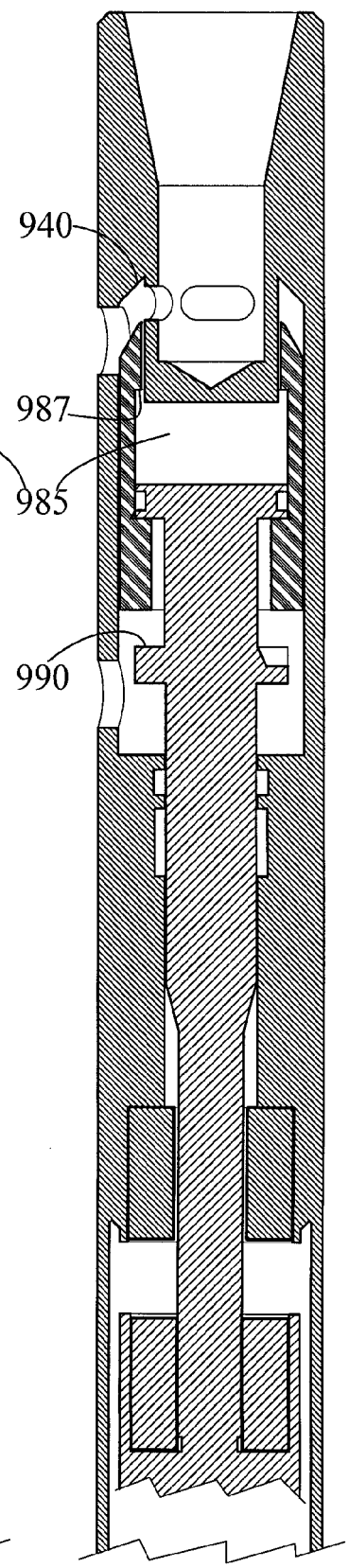

… …

MAGNETS-BASED TOOL FOR PULSING INJECTED LIQUID

This technology relates to injection of a liquid, typically water, into a borehole in the ground. Creating pulses in the injected liquid can be effective to increase the penetration of the liquid for greater distances radially outwards from the borehole, and can also be effective to reduce fingering, and to homogenize the permeability of the ground around the borehole.

BACKGROUND

Liquid is supplied to the pulsing tool, typically from a reservoir at the surface. A pressurized volume of the liquid is contained in an accumulator, which may be regarded as including the volume contained in the pipe or conduit leading down, from the surface, to the pulse-tool.

The pulse-tool includes a pulse-valve, through which liquid passes from the accumulator into the formation when the pulse-valve is open. That flow is blocked when the pulse-valve is closed. Thus, the formation-pressure is rising when the pulse-valve is open, and the formation-pressure is falling when the pulse-valve is closed, when the just-injected liquid dissipates into the ground. Likewise, the accumulator-pressure is falling when the pulse-valve is open, and is rising (i.e the accumulator is recharging) when the pulse-valve is closed.

The frequency and magnitude of the pulses is affected by the back-pressure of the ground formation around the borehole. The formation-pressure rises/falls, and the accumulator-pressure falls/rises, when the pulse-valve is open/closed.

The pulse-valve operates automatically in response to changes in these pressures, and particularly in response to the changing differential pressure between the accumulator-pressure and the formation-pressure, herein termed the PDAF. When the pulse-valve is closed, the PDAF increases towards its high-threshold; when the pulse-valve is open, the PDAF decreases towards its low-threshold. The pulse-valve automatically cycles open-closed-open-closed-etc, so long as the conditions are such that the PDAF cycles between its high- and low-threshold levels.

The designers seek to open the pulse-valve very rapidly, because the resulting burst of energy can create a shock-wave that assists the pulse in travelling large distances through the ground. The more explosively the pulse-valve can open, the greater the energy of the resulting shock-wave, and the greater its penetration.

SOME FEATURES OF THE INVENTION

In the technology depicted herein, the differential pressure PDAF is applied in such manner as to urge a pulse-valve member to move to the pulse-valve-open position. Resisting this PDAF-induced force on the valve-member is a force arising from the contact, or near-contact, of a pair of permanent magnets. When the PDAF reaches its high-threshold, the magnets break apart, and the pulse-valve opens.

As the magnets move apart, the force urging them together drops very quickly, and this is a characteristic that favours rapid opening of the pulse-valve.

Preferably, the magnets are immersed in an oil-bath, which protects the magnets from contact with liquid-borne metal particles.

DETAILED DESCRIPTION OF PREFERRED EMBODIMENTS

The technology will now be further described with reference to the accompanying drawings, in which (all the drawings being cross-sectioned side-elevations):

FIG. 1 shows a portion of a pulse-tool.

FIG. 2 shows the pulse-tool installed in a well-bore in the ground.

FIG. 3A shows a fixed housing of another pulse-tool.

FIG. 3B shows a movable-unit corresponding to the housing of FIG. 3A.

FIG. 4A shows the movable-unit assembled into the fixed housing, in a pulse-valve-closed condition.

FIG. 4B is the same view as FIG. 4A, but shows the pulse-valve open.

FIG. 5 shows an alternative oil-bath arrangement.

FIG. 6A shows a fixed-housing of a further pulse-tool.

FIG. 6B shows a movable hammer component, corresponding to the housing of FIG. 6A.

FIG. 6C shows a movable valve-seat component, corresponding to the housing of FIG. 6A.

FIG. 7A shows the assembled pulse-tool from FIGS. 6A,6B,6C in a pulse-valve-closed condition.

FIG. 7B is the same view as FIG. 7A, showing the pulse-valve about to open.

FIG. 7C is the same view as FIG. 7A, showing the pulse-valve open.

FIG. 8A is the same view as FIG. 7A, showing the pulse-valve starting to close.

FIG. 8B is the same view as FIG. 7A, showing the pulse-valve more nearly closed.

FIG. 8C is the same view as FIG. 7A, showing the pulse-valve still more nearly closed.

FIG. 9A shows yet another pulse-tool, in the pulse-valve-closed condition.

FIG. 9B is the same view as FIG. 9A, showing the pulse-valve about to open.

FIG. 9C is the same view as FIG. 9A, showing the pulse-valve fully open.

The pulse-tool 20, shown in its closed position in FIG. 1, is for use in conjunction with apparatus for injecting a liquid into a well-bore in the ground. The liquid is supplied from a surface station (FIG. 2), where the liquid is stored in a pressurized container or accumulator 23. Supply-tubing 25 extends down the well-bore to the pulse-tool 20. The supply-tubing 25 can be regarded as part of the accumulator.

The pulse-tool 20 is equipped with exit-ports 27, through which the liquid is forced out of the pulse-tool. The ejected liquid enters the annular space 28 between the pulse-tool 20 and the well-casing 29. From there, the liquid enters the ground-formation 30, via perforations 32 in the casing 29.

In some cases, a packer (e.g an inflatable packer 34) is provided to close off the annular space above the perforations 32; and another packer can be placed below the perforations, if required. In other cases, there is no packer, and liquid from the surface-station is injected into the annular space 28. In that case, the liquid enters the formation in a continuous stream, whether the pulse-valve is open or closed. The pulse-tool 20 is used to impress pulses on the continuous stream. When a packer is used, the flow of liquid is blocked, more or less completely, and no liquid enters the ground formation when the pulse-valve is closed.

In FIG. 1, the pulse-valve 36 includes a movable valve-member 38, which is in engagement with a valve-seat 40. The valve-seat 40 is formed in the fixed housing of a valve-section 43 of the tool 20. A rubber seat-seal 45 seals the pulse-valve 36 closed at this time. The movable valve-member 38 is a component of a movable-unit 47.

Another component of the movable-unit 47 is a movable magnet 49, which is press-fixed into a magnet-cup 50. A fixed magnet 52 is similarly press-fixed into the fixed housing of the pulse-tool 20. The movable magnet 49 is dimensioned such that, when the movable magnet 49 is assembled into the magnet-cup 50, a lip of the magnet-cup 50 protrudes slightly (e.g 0.1mm), beyond the face of the movable magnet 49. The presence of the protruding lip ensures that the two magnets 49,52 cannot actually touch together.

The movable unit 47 is subjected to the supply pressure of the accumulator 23 on its upwards-facing surfaces. The movable unit 47 is subjected to the pressure in the ground formation 30 on its downwards-facing surfaces. Thus, the movable unit 47 is subjected to a pressure differential equal to the difference between the accumulator pressure and the formation pressure, measured at the depth of the exit-port 27. This differential is herein termed PDAF.

When the pulse-valve 36 is open, liquid flows out of the accumulator 23 into the formation 30. The accumulator pressure is falling and the formation pressure is rising, and thus the PDAF is decreasing, when the pulse-valve is open. The pulse-valve is designed to close when the PDAF falls to a low-threshold.

When the pulse-valve 36 is closed, the accumulator 23 is replenished, and so the accumulator pressure is rising. At the same time, recently injected liquid dissipates into the formation, and so the formation pressure is falling. Therefore, the PDAF is increasing when the pulse-valve 36 is closed. The pulse-valve is designed to open when the PDAF reaches a high-threshold.

The high-threshold and low-threshold magnitudes of the PDAF, at which the pulse-valve 36 opens and closes, are determined by the designers, the thresholds being a function of the pressure-exposed areas of the movable-unit 47 and of the strength of the magnets 49,52.

When the pulse-valve is closed (FIG. 1) the accumulator pressure acts downwards on the unit 47 over the upwards-facing pressure-exposed area A1 of the movable valve-member 38, and the formation pressure acts upwards over an equal down-facing area. Thus, the force driving the unit 47 downwards, when the pulse-valve is closed, equals the (rising) magnitude of PDAF multiplied by the area A1. The force driving the unit 47 upwards is the attractive force arising from the magnets 49,52. The high-threshold is reached when the rising PDAF force equals the magnetic attraction force.

When this happens, the magnets 49,52 start to separate. Thus, the movable-unit 47 starts to move downwards. After a few millimetres of downward movement, the valve-member 38 moves clear of the seat-seal 45, and the pulse-valve opens.

At this point, the magnets being now separated, the attractive force between the magnets has now decreased. Therefore, the difference between the PDAF-force (acting downwards) and the magnet-force (acting upwards) has increased considerably.

The result is that the movable-unit 47 now slams downwards. Thus, the pulse-valve changes from closed to full-open very rapidly indeed. It may be regarded that the pulse-valve opens explosively.

The contrast between the opening of the present magnet-controlled pulse-valve and, for example, a coil-spring-controlled pulse-valve will now be considered. When the valve is biased closed by magnetic attraction, and the magnets start to separate, the attractive force between them starts to fall. When the valve is biased closed by a coil-spring, and the coil-spring starts to deflect, the spring force starts to rise.

A coil-spring has a positive spring-rate. That is to say: the force required to further deflect a coil-spring increases as the deflection of the coil-spring increases. By contrast, magnets in attraction have a negative spring-rate. That is to say: the force required to further separate a pair of magnets decreases as their separation increases. (It may be noted that, if the valve were to be biased closed by magnetic repulsion, the spring-rate then would be positive, like a coil-spring.)

The negative rate is desirably advantageous in the case of a valve which is biased closed, but has to open explosively. Furthermore, while the spring-rate of a coil-spring is linear, the spring-rate of a pair of magnets, arranged for attraction, is markedly non-linear; that is to say, the decrease in attraction force as the magnets separate from zero (or almost zero) to the first millimetre is a much greater decrease than the decrease in force as the magnets separate e.g from the fourth millimetre to the fifth millimetre. (With magnets, in fact the incremental decrease in attraction force is proportional to the square of the separation distance.) This non-linearity is also desirably advantageous in the case of a valve that has to be biased closed against a large pressure differential, but has to open explosively.

The pulse-valve 36 remains open, and liquid pours out into the formation, until the PDAF has fallen to its low threshold. Even though the pulse-valve is wide open, the PDAF does not fall to zero. Liquid flows through the valve at a large flowrate, and in fact, the operators see to it that the flowrate is so large that there still is a significant pressure drop through the pulse-valve even though the pulse-valve is wide open. Furthermore, the flowing liquid undergoes a change in the direction of its momentum vector as it passes through the valve, in that downwards momentum of the flowing liquid is lost as the liquid acquires radially-outwards velocity. Diverting the momentum vector imparts a downwards force on (the conical upper surface of) the movable-unit 47.

As the outwards flow of liquid slows down, however, the PDAF-force, and the dynamic reaction force on the valve-member, both decrease, and eventually the low-threshold of the PDAF is reached, in which the downward force on the movable unit 47 is low enough that it can be overcome even by the weak attraction of the now-spaced-apart magnets 49,52.

When the low-threshold level of the PDAF is reached, the magnets start to move together. As they do so, their attraction force increases. So, the closing movement, which at first was gradual, becomes more rapid until finally the valve is fully closed.

The negative spring-rate of the magnets therefore gives rise to the characteristic that the pulse-valve closes rapidly, as well as opening explosively. In turn, this means that the pulse-valve can be regarded as bistable, being significantly unstable at intermediate points between open and closed, whereby it is (almost) impossible for the pulse-valve to become hung up at an intermediate point. This is an advantageous characteristic from the standpoint of maintaining performance over a long service life.

FIG. 3A shows the fixed housing 341 of another pulse-tool 320. FIG. 3B shows the movable-unit 347 of that tool. FIGS. 4A,4B show the movable-unit assembled into the fixed housing. The pulse-tool 320 operates in the same way as the pulse-tool 20, in that the closed pulse-valve opens when the PDAF reaches its high-threshold, and closes when the PDAF reaches its threshold. The pulse-valve 336 in FIGS. 4A,4B has no rubber seal, but rather the seal is formed by the tight fit of the valve-member 338 in the valve-seat 340.

Of course, some leakage will occur when the pulse-valve 336 is closed, as in FIG. 4A. However, that is not detrimental. As far as the pulses are concerned, it is the rapidity with which the pulse-valve 336 opens from almost-closed to full open, that is important in energizing the pulse. The more violently the pulse-valve opens, the more energetic the pulse. The pulse-valve then remains wide open until the PDAF decreases to its low-threshold.

FIGS. 3A,3B,4A,4B also show an oil-bath 356, in which the magnets 349,352 are completely immersed. The oil-bath 356 is contained between an upper oil-seal 358 and a lower oil-seal 360. The two oil-seals 358,360 are of the same diameter, so that, as the movable-unit 347 moves up/down, the volume of the oil-bath remains the same. However, the shape of the volume changes as the unit 347 moves, and the oil moves between the different chambers of the volume through the centre conduit 361 of the movable-unit 347.

Oil is injected (during assembly of the tool) into the oil-bath through a bottom check-valve 363. Another check-valve 365 is provided at the top of the oil-filled volume, which functions as a pressure relief valve. The oil fills up the spaces and chambers between the upper and lower oil-seals 365,363. That is to say, when the oil-bath has been filled and pressurized, oil emerging from the top check-valve 365 witnesses that fact, and indicates also that all the air has been bled out of the oil-filled volume.

If it should happen that the pressure of the oil in the oil-bath 356 drops to a low magnitude, the bottom check-valve 363 opens, and admits a quantity of water from the ground formation into the oil-bath. Also, if it should happen that the oil in the oil-bath should expand, such that the pressure inside the oil-bath rises, the top check-valve permits the excess pressure to blow off. In fact, these check-valves 363,365 open very rarely during operational service, but they can be useful when the tool is brought to the surface, in ensuring that there is little or no excess pressure in the oil-bath, which might be a safety hazard.

The oil-bath 356 provides lubrication for the moving parts. However, a major function of the oil-bath is to keep the magnets clean. Powerful magnets attract small particles of ferrous and other magnetic material, of which there is an all-too-copious supply in down-hole tools and equipment—deriving both from the tool itself and from being carried down via the liquid being injected. If the magnets were allowed to come in contact with the injected liquid, they would become coated with magnetic debris in a very short time. The oil-bath prevents this magnetic debris from actually touching the magnets.

Preferably, the upper 358 and lower 360 seals of the oil-bath should be exposed to the same pressure, and preferably both to the formation pressure. Of the dynamic seals in the tool, the oil-bath seals should seal perfectly, since the oil should not leak out. By contrast, the dynamic seals separating the formation pressure from the accumulator pressure, including the seal of the pulse-valve, can generally be allowed to leak slightly, and the expression "closed" in relation to the pulse-valve should be construed accordingly.

An alternative oil-bath arrangement is shown in FIG. 5. The oil-bath is enclosed by the volume defined between the two oil-seals 558,560. The movable-unit 547 is guided by bearings 566. The oil is in contact with the upper face of a piston 562, the lower face of which is exposed to formation pressure. Thus, the pressure of the oil is always equalized to the formation pressure. Thus, both sides of the two oil-seals 558,560 are exposed, effectively, to formation pressure, which helps to minimize seal-friction. Preferably, in fact, a bias-spring 564 helps ensure that the oil-pressure (slightly) exceeds the external pressure.

It may be noted that the assembly shown in FIG. 5—like that of the other oil-baths shown herein—is self-contained, and can remain intact during routine resettings and adjustments of the pulse-tool; the assembly can also be removed, still with the oil-bath intact, from the rest of the tool, e.g for bench-servicing of the oil-bath components.

The magnets 349,352 are annular-cylindrical in shape. In the example, the magnets are rare-earth magnets, being of grade-N52 neodymium-iron-boron permanent magnet material. The fact that such magnets lose power at elevated temperatures is not significant, because, even if there were a tendency for the tool to become heated, the tool is constantly being bathed in the (cool) liquid being injected.

The magnets are mechanically pressed into their housings. As mentioned, the housings have lips 354, which protrude slightly beyond the surface of the magnet, which prevents the magnets themselves from making contact. The magnets and their nickel plating are very brittle and might chip upon impact.

In the size of magnet likely to be selected in a down-hole tool of the kind as described herein, the attractive force between two magnets, when close together, can be expected to be in the order e.g of 500 newtons. At a separation of ten mm, typically the force has dropped to 140 N, at fifteen mm to 92 N, and at twenty mm to 63 N.

The pulse-valve 336 is fully open when the bottom end of the movable-unit 347 contacts the nose 367 of the fixed housing 341 (FIG. 4B). The designers can make this distance adjustable if so desired. They can add cushioning if the impact is troublesome.

As mentioned, where the full travel of the movable unit is e.g fifteen mm, it can be expected that a magnetic attraction of 500 N (when the magnets are (almost) together) will have dropped to 92 N. The designers might consider this force to be too small to ensure that the movable-unit will move sharply upwards (the PDAF having reached its low-threshold) with the required degree of certainty and reliability. If so, they can incorporate a spring, e.g a coil-spring 369 into the nose 367, as in FIG. 3A, such that the bottom end of the movable-unit engages the coil-spring 369 as it nears its full downwards travel stroke.

The added coil-spring 369 makes the effective aggregate spring-rate of the forces acting on the movable-unit 347 now positive (or at any rate makes the spring-rate less negative), whereby, in the example, the force urging the movable-unit 347 upwards, at the fifteen mm point, can be e.g 150 N (or such other magnitude as the designers may decide) instead of the 92 N.

In order to increase, still further, the rapidity of the opening of the pulse-valve, the movable-unit can be formed as two separate components, which are movable relative to each other. In one version of a divided movable-unit, the valve-seat is arranged to be movable.

FIG. 6A shows the fixed-housing 641, to which the fixed magnet 652 is attached; FIG. 6B shows what may be termed a movable hammer component 670 of the movable-unit 647, to which the moving magnet 649 is attached; and FIG. 6C shows the other movable component of the movable-unit 647, namely a movable valve-seat 672.

FIG. 7A shows these components assembled and in their pulse-valve-closed positions. FIG. 7B shows the two movable components 670,672 of the movable-unit 647 moving downwards together, in unison, whereby the pulse-valve 636 remains closed. In FIG. 7C, the motion of the movable valve-seat 672 has been arrested, while the movable hammer 670 has continued downwards, whereby the pulse-valve 636 has now opened.

In FIG. 7A, the hammer 670 is in its uppermost position, being held there by the fact that the magnets 649,652 are (almost) touching, being held slightly apart, as mentioned, by the slightly-protruding lip of the magnet-cup (not shown in FIG. 7A.)

The upwards-facing surfaces of the movable valve-seat 672 are exposed to accumulator-pressure, while its downwards-facing surfaces are exposed to formation-pressure. The same is true of the hammer 670. The PDAF urges the valve-seat 672 downwards, and into forceful contact with the conical surface 673 of the hammer 670. While the PDAF is below its high-threshold, the PDAF is not yet strong enough to break the magnets apart, nor to dislodge the hammer 670.

In FIG. 7B, the PDAF has reached the high-threshold, and the magnets 649,652 have broken apart. The valve-seat 672 and the hammer 670 move downwards together, in unison as the movable-unit 647. Then, the downwards motion of the valve-seat 672 is arrested by its striking the shoulder 674 (see FIG. 6A) of the fixed component 641. Now, the hammer 670 continues to move downwards on its own.

In FIG. 7C, the hammer 670 has separated from the valve-seat 672, whereby the pulse-valve 636 is now open. The pulse-valve remains open until the PDAF has fallen to its low-threshold.

FIGS. 8A,8B,8C show the return of the moving components back to the FIG. 7A pulse-valve-closed condition. In FIG. 8A, the PDAF being now at its low point, the magnets, in attraction, have moved the hammer 670 upwards until a bump 676 on the hammer engages a collet-arm 678 of the movable valve-seat component 672. At this point, the valve-seat 672 is experiencing little resistance to upwards movement, and so the valve-seat 672 is carried upwards by the magnets-induced upwards movement of the hammer 670. The valve-seat 672 travels upwards until its upper face contacts the face 680 of the fixed housing 641, as shown in FIG. 8B.

Now, the valve-seat 672 can travel upwards no further. But the magnets are capable of moving the hammer 670 upwards, against the resistance of the engagement of the collet-arm 678 with the bump 676. The collet-arm deflects, and allows the bump to pass. The hammer then continues to travel upwards, until the magnets 649,652 are (almost) together, as shown in FIG. 8C.

Now, even though the pulse-valve 636 is still open at this point, the pulse-valve is almost closed. In fact, the pulse-valve is sufficiently closed for a pressure-drop to develop across the pulse-valve. The PDAF can therefore rise to the (small) magnitude that is all that is needed to drive the valve-seat component 672 downwards, and into forceful contact with the conical surface 673 of the hammer 670. Once the pulse-valve 636 closes, the tool 620 is once more in the condition shown in FIG. 7A. The PDAF now rises once more, towards its high-threshold, and a new cycle commences.

FIGS. 9A,9B,9C show another version in which the movable-unit 947 is formed as two separate components, which are movable relative to each other. One movable component is the valve-member 981 itself, and the other component (to which is attached the moving-magnet 949) is a hammer component 983.

FIG. 9A shows the tool 920 in the pulse-valve-closed condition. The magnets 949,952 are holding the hammer 983 in its uppermost position, against the rising PDAF. The chamber 985 is open to accumulator pressure, which acts downwards against the upper face of the hammer 983 and acts upwards against the downwards-facing annular-area 987 of the movable valve-member 981, thereby urging the valve-member 981 into contact with the valve-seat 940 in the fixed housing 941, and holding the pulse-valve 936 closed. (More accurately, the annular area 987 is the area defined between the diameter of the hammer-seal 989, and the effective diameter of the sealing engagement between the valve-seat 940 and the valve-member 981.)

When the PDAF reaches its high-threshold, the hammer 983 moves first, while the valve-member 981 remains still. FIG. 9B shows the hammer moving downwards, and about to contact the shoulder 989 of the valve-member 981. Only when the (heavy) hammer 983 has gained some speed and momentum does it then strike the (light) valve-member 981, violently knocking the valve-member clear of the fixed valve-seat 940, and hurling the valve-member 981 to its full-open condition very rapidly indeed. The pulse-valve-open condition is shown in FIG. 9C.

When the PDAF has fallen to its low-threshold, the magnets 949,952 start the hammer 983 on its upward movement. The ledge 990 on the hammer 983 picks up the valve-member 981, and carries the valve-member to a position in which the pulse-valve 936 is almost closed. At this point, the magnets are (almost) closed together, and the hammer 983 can rise no further. Now, even though the pulse-valve 936 is not quite closed, still a pressure-drop can develop across it, and the resultant PDAF is large enough to drive the valve-member 981 upwards until the valve-member closes against the valve-seat 940, once again, as in FIG. 9A.

In the above examples, only one pair of magnets is illustrated. However, two, three, four, etc, pairs of magnets can be employed, each pair making its own contribution to the total force available to urge the pulse-valve to its closed position. In a down-hole environment, radial space in the tool is at a premium, but axial (up/down) space is usually of little consequence, and the magnet pairs can be readily incorporated into the tool, one above the other. In respect of each pair, one of the magnets is unitary with the fixed housing, and the other magnet is unitary with the movable-unit. Preferably, the pairs are arranged all in a common oil-bath. FIG. 2 shows lower sections 93,94 incorporating extra magnet pairs.

The metal components of the tool preferably should be made of stainless steel, not only for the usual down-hole environmental reasons, but because stainless steel, generally, is only mildly magnetic. For most of the components of the tool, the mildly-magnetic e.g type 17-4ph stainless steel is a suitable material.

The magnets themselves are shielded by the oil-bath from direct contact with magnetic debris. However, the presence of the magnets can cause the components in which they are housed to become magnetized. This can be advantageous in that the magnetization of the magnet-cups and housing helps to hold the magnets firmly fixed to those components. The outer housing of the tool, at least near the magnets, will be affected by the magnetic forces, and it is likely that particles will adhere to the outer surface of the tool; but it is recognized that this is not troublesome, and that 17-4ph stainless steel is a suitable material.

However, the valve-member 38 and the valve-seat 40 are especially vulnerable, since magnetic debris might be very troublesome if these components were to be even slightly magnetized. Therefore, these components preferably should be of metal that is non-magnetic—or preferably, these components should be separated from the magnets by metal that is non-magnetic. (Alternatively, the valve-member 38 and valve-seat 40 can be made of e.g non-magnetic ceramic material.)

At the same time, the valve-member and the valve-seat need to be tough and hard-surfaced, since these are the components that move vigorously relative to each other when performing their functions in the tool. Since the highly-non-magnetic stainless steels (e.g type 316 stainless steel) tend not to be the hardest, it is preferred—not to make the valve-member and the valve-seat themselves from non-magnetic material, but—to insulate the valve-member and valve-seat from the magnets by making the intermediate components from non-magnetic material.

Thus, in FIGS. 3-4B, the movable valve-member 38 and the fixed valve-seat 40 are formed as separate components, which can be readily disassembled and replaced, if they do become worn, and these components preferably are made from the hard type 17-4ph (mildly-magnetic) stainless steel. The stem 396 of the movable-unit 47 and the valve section 43 of the housing are made from the type 316 (non-magnetic) stainless steel.

The ground formation into which the liquid is being injected is porous and permeable. Pulsing proceeds when the ground conditions are such that the formation pressure rises at a steady rate when the pulse-valve is open, and falls at a steady rate when the pulse-valve is closed. Likewise, the liquid supply and accumulator should be such as to create equivalent steady rates of rise/fall of the accumulator pressure, when the pulse-valve is closed/open.

Although they cannot control the rate at which the injected liquid dissipates into the formation, the operators do have control over the high-threshold of the PDAF (at which the pulse-valve opens). The high-threshold can be adjusted by changing the magnetic attraction force (e.g by adding more magnets), or by changing the area of the surfaces that are exposed to the PDAF. Having thus set the high-threshold, of course the operators must see to it also that the supply of liquid is capable of producing an accumulator pressure of the required magnitude. The operators should also provide a suitable flowrate, at that pressure, so that the accumulator recharges itself quickly. The time it takes the accumulator to recharge, after a pulse, is included in the cycle time of the tool.

Having set the level of the high-threshold, the operators adjust the level of the low-threshold basically by adjusting the force that is exerted by the magnets (and by the coil-spring, if one is provided) when the pulse-valve is fully open.

The rate or frequency at which the pulse-tool creates pulses is thus determined partly by the ground conditions and partly by the adjustments and settings in the tool. However, it should be noted that the pulse-valve opens just as explosively whether the pulse-frequency is fast or slow.

In the accompanying drawings, some of the components and assemblies are shown diagrammatically. Of course, the designer must configure the components in such manner that they can be assembled and disassembled.

Not all the details of construction are shown in all the drawings. Skilled designers will understand that details from one drawing are, where possible, to be applied also to other drawings, as far as possible. Options shown in connection with one of the drawings should be understood to be optional also in the rest of the drawings, as far as possible.

Terms used herein, such as "vertical", "equal", and the like, which define respective theoretical constructs, are intended to be construed according to the purposive construction.

A reference to a component being "integral" with another component means, herein, that the two components are either formed from one common piece of material, or, if formed separately, are fixed together in such manner as to be functionally and operationally equivalent to having been formed from one common piece of material.

The scope of the patent protection sought herein is defined by the accompanying claims. The apparatuses and procedures shown in the accompanying drawings and described herein are examples.

The numerals used in the drawings are summarized as follows.
FIGS. 1-2:
20 pulse-tool
21 surface station
23 accumulator
25 supply-tubing
27 exit-port of pulse-tool
28 annular space between tool and casing
29 well-casing
30 ground formation
32 perforations through well-casing
34 packer
36 pulse-valve
38 movable valve-member
40 fixed valve-seat
41 fixed housing of tool
43 valve-section of housing (non-magnetic)
45 seat-seal
47 movable unit
49 moving magnet
50 moving magnet-cup
52 fixed magnet
54 lip of magnet-cup
93 additional lower section, containing 2nd pair of magnets
94 additional lower section, containing 3rd pair of magnets
FIGS. 3-4B:
320 pulse-tool
336 pulse-valve
338 movable valve-member
340 fixed valve-seat
341 fixed housing of tool
347 movable unit
349 moving magnet
352 fixed magnet
354 lips of magnet housings
356 oil-bath
358 upper oil seal
360 lower oil seal
361 centre conduit in movable unit 347
363 bottom check valve
365 top check valve
367 nose of housing
369 coil spring
396 stem of movable unit
FIG. 5
547 movable-unit
558 upper oil-seal
560 lower oil-seal
562 pressure-equalizing piston
564 bias-spring
566 bearings
FIGS. 6A-8C
620 pulse-tool
636 pulse-valve
641 fixed housing of tool
647 movable unit
649 moving magnet
652 fixed magnet
670 movable hammer
672 movable valve-seat
673 conical surface
674 shoulder in fixed housing
676 bump on hammer 670
678 collet-arm on hammer
680 face in fixed housing
FIGS. 9A-9C 920 pulse-tool
936 pulse-valve
940 fixed valve-seat
941 fixed housing of tool
947 movable unit
949 moving magnet
952 fixed magnet
981 movable valve-member
983 movable hammer
985 chamber above hammer
987 down-facing annular area on valve-member 981
989 up-facing shoulder on valve-member 981
990 up-facing ledge on hammer 983

The invention claimed is:

1. Tool for pulse-injecting liquid from a borehole out into the surrounding ground-formation, wherein:
the tool includes a pulse-valve;
the pulse-valve includes a valve-seat and a relatively-movable valve-member;
the tool includes a pair of magnet-elements, one connected to the valve-seat, the other to the valve-member;
the magnet-elements are arranged in the tool for magnetic attraction;
the magnet-elements urge the pulse-valve closed;
the tool is so configured that the two magnet-elements are close together when the pulse-valve is closed, and apart from each other when the pulse-valve is open;
whereby, when the pulse-valve opens, the magnetic attraction between the two magnet-elements decreases;
the tool includes a supply of liquid, stored in an accumulator at accumulator-pressure;
liquid in the ground formation is at formation-pressure;
the pressure differential between accumulator-pressure and formation-pressure is termed the PDAF;
the tool is so configured that, during operation:
(a) when the pulse-valve is closed, the PDAF is increasing towards a high-threshold at which the Pulse-valve opens; and
(b) when the pulse-valve is open, the PDAF is decreasing towards a low-threshold at which the pulse-valve closes;
the movable valve-member is a component of a movable-unit, which is movable relative to a fixed housing of the tool;
one of the magnet-elements is integral with the movable-unit, and the other is integral with the fixed housing;
the tool is so configured that, during operation, the PDAF urges the movable-unit in the direction to open the pulse-valve with a force termed the PDAF-force;
the PDAF-force is termed the closed-PDAF-force when the Pulse-valve is closed;
the PDAF-force is termed the open-PDAF-force when the Pulse-valve is open;
the magnet-elements bias the valve-member in the direction to close the pulse-valve with a force termed the magnet-force;
the magnet-force is termed the closed-magnet-force when the pulse-valve is closed;
the magnet-force is termed the open-magnet-force when the Pulse-valve is open;
the high-threshold of the PDAF is the magnitude of the increasing PDAF at which the closed-PDAF-force equals the closed-magnet-force;
the low-threshold of the PDAF is the magnitude of the decreasing PDAF at which the open-magnet-force equals the open-PDAF-force;
whereby the pulse-valve cycles automatically between open and closed.

2. As in claim 1, wherein at least one of the two magnet-elements of the pair is a permanent magnet.

3. As in claim 1, wherein:
the two magnet-elements are respective permanent magnets;
each magnet is a rare-earth magnet, of grade N-52 or higher.

4. As in claim 3, wherein each magnet is annular-cylindrical.

5. As in claim 1, wherein:
a moving-magnet of the pair of magnets is fixedly mounted in the movable-unit;
the other of the pair of magnets, termed the fixed-magnet, is fixedly mounted in the fixed housing.

6. As in claim 5, wherein:
the tool includes two or more pairs of magnets, each pair comprising a moving-magnet and a fixed-magnet;
all the moving-magnets are fixedly mounted in the movable-unit;
all the fixed-magnets are fixedly mounted in the fixed housing.

7. As in claim 1, wherein:
the movable-unit includes a hammer, and the valve-member is integral with the hammer;
the one of the magnet-elements that is integral with the movable-unit is integral with the hammer;
the valve-seat is mounted for movement relative to the fixed-housing;
the hammer and the valve-seat are formed with respective accumulator-areas, which are exposed to the accumulator pressure, and with respective opposed formation-areas, which are exposed to formation-pressure, the hammer and the valve-seat being thus exposed to the PDAF;
the tool is so structured that, when the PDAF reaches its high-threshold:
(a) the valve-seat and the hammer at first move in unison for a small distance, and the magnet-elements separate;
(b) then the movement of the valve-seat is arrested;
(c) and the hammer continues to move, and the moving hammer drives the valve-member away from the valve-seat.

8. As in claim 1, wherein:
the movable valve-member is a component of a movable-unit, which is movable relative to a fixed housing of the tool;
the movable-unit includes a hammer;
the one of the magnet-elements that is integral with the movable-unit is integral with the hammer;
the hammer and the valve-member are relatively movable;
the tool is so structured that, when the PDAF reaches its high-threshold:
(a) the hammer moves in the direction to open the pulse-valve, and the magnet-elements separate;
(b) at first, the valve-member does not move, while the hammer moves a small distance;
(c) and then, the moving hammer collects the valve-member, and the moving hammer drives the valve-member away from the valve-seat.

9. As in claim 8, wherein the tool is so structured that, when the pulse-valve is closed, the PDAF acts over a small area of the valve-member to bias the valve-member against the valve-seat.

10. As in claim 1, wherein:
the tool is so structured and arranged that:
(a) the closed-PDAF-force is substantially larger than the open-PDAF-force, for a given magnitude of the PDAF; or
(b) the closed-magnet-force is substantially larger than the open-magnet-force; or
(c) both.

11. Tool for pulse-injecting liquid from a borehole out into the surrounding ground-formation, wherein:
the tool includes a pulse-valve;
the pulse-valve includes a valve-seat and a relatively-movable valve-member;
the tool includes a pair of magnet-elements, one connected to the valve-seat, the other to the valve-member;
the magnet-elements are arranged in the tool for magnetic attraction;
the magnet-elements urge the pulse-valve closed;
the tool is so configured that the two magnet-elements are close together when the pulse-valve is closed, and apart from each other when the pulse-valve is open;
whereby, when the pulse-valve opens, the magnetic attraction between the two magnet-elements decreases;
the movable valve-member is a component of a movable-unit, which is movable relative to a fixed housing of the tool;
the tool includes an oil-bath;
the oil-bath includes a sealed chamber defined between upper and lower oil-seals, which seal the movable-unit to the fixed housing;
the two magnet-elements are located inside the sealed chamber, and are immersed in oil therein;
the tool is so configured that the volume of the enclosed chamber remains constant during movement of the movable-unit relative to the fixed housing.

\* \* \* \* \*